(12) United States Patent
Adachi et al.

(10) Patent No.: US 9,964,001 B2
(45) Date of Patent: May 8, 2018

(54) THERMAL ENERGY RECOVERY DEVICE

(71) Applicant: Kobe Steel, Ltd., Kobe-shi (JP)

(72) Inventors: Shigeto Adachi, Takasago (JP); Yutaka Narukawa, Takasago (JP); Kazumasa Nishimura, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 425 days.

(21) Appl. No.: 14/669,471

(22) Filed: Mar. 26, 2015

(65) Prior Publication Data

US 2015/0330262 A1    Nov. 19, 2015

(30) Foreign Application Priority Data

May 13, 2014    (JP) .................................. 2014-099510

(51) Int. Cl.
| | |
|---|---|
| *F01K 23/10* | (2006.01) |
| *F01K 9/02* | (2006.01) |
| *F02G 5/02* | (2006.01) |
| *F01K 27/00* | (2006.01) |
| *F01K 7/16* | (2006.01) |

(Continued)

(52) U.S. Cl.
CPC ................ *F01K 23/10* (2013.01); *F01K 7/16* (2013.01); *F01K 9/003* (2013.01); *F01K 9/02* (2013.01); *F01K 13/00* (2013.01); *F01K 13/02* (2013.01); *F01K 23/065* (2013.01); *F01K 25/06* (2013.01); *F01K 25/08* (2013.01); *F01K 27/00* (2013.01);

(Continued)

(58) Field of Classification Search
CPC . F01K 7/16; F01K 9/003; F01K 13/00; F01K 13/02; F01K 25/06; F01K 25/08; F01K 27/00
See application file for complete search history.

(56) References Cited

U.S. PATENT DOCUMENTS

| | | | |
|---|---|---|---|
| 3,938,335 A | * | 2/1976 | Marwick ................. F01K 25/04 122/28 |
| 4,942,734 A | | 7/1990 | Markbreiter et al. |

(Continued)

FOREIGN PATENT DOCUMENTS

| | | |
|---|---|---|
| CN | 103206276 A | 7/2013 |
| JP | 56-32017 A | 4/1981 |

(Continued)

*Primary Examiner* — Mark Laurenzi
*Assistant Examiner* — Wesley Harris
(74) *Attorney, Agent, or Firm* — Oblon, McClelland, Maier & Neustadt, L.L.P.

(57) ABSTRACT

A thermal energy recovery device of the present invention includes a heater that evaporates a working medium by a heat medium, an expander into which the working medium flowing out from the heater flows, a power generator that recovers expansion energy of the working medium expanded in the expander, a condenser of a condensing unit that condenses the working medium flowing out from the expander, and a pump that feeds the working medium condensed in the condenser to the heater. A connection portion between the condenser and the pump has a connection end portion connected to an inflow port of the pump, a bent portion bent upward from the connection end portion, and a standing portion extending upward from the bent portion so that the working medium in a gas phase is suppressed from coming into the pump even in an environment where vibration is generated.

5 Claims, 10 Drawing Sheets

(51) Int. Cl.
*F01K 9/00* (2006.01)
*F01K 25/08* (2006.01)
*F01K 13/00* (2006.01)
*F01K 25/06* (2006.01)
*F01K 13/02* (2006.01)
*F25B 1/00* (2006.01)
*F25B 27/02* (2006.01)
*F01K 23/06* (2006.01)

(52) U.S. Cl.
CPC .................. *F02G 5/02* (2013.01); *F25B 1/00* (2013.01); *F25B 27/02* (2013.01)

(56) References Cited

U.S. PATENT DOCUMENTS

| | | | |
|---|---|---|---|
| 2009/0199557 A1* | 8/2009 | Bennett | F01K 3/008 60/641.15 |
| 2012/0285169 A1 | 11/2012 | Freund et al. | |

FOREIGN PATENT DOCUMENTS

| | | |
|---|---|---|
| JP | 63-65805 U | 4/1988 |
| JP | 2004-339965 A | 12/2004 |
| JP | 2006-316767 | 11/2006 |
| JP | 2009-293838 A | 12/2009 |
| JP | 2011-12625 A | 1/2011 |
| JP | 2012-202374 | 10/2012 |
| JP | 2013-32725 A | 2/2013 |
| JP | 2013-510984 | 3/2013 |
| JP | 2013-68137 A | 4/2013 |

* cited by examiner

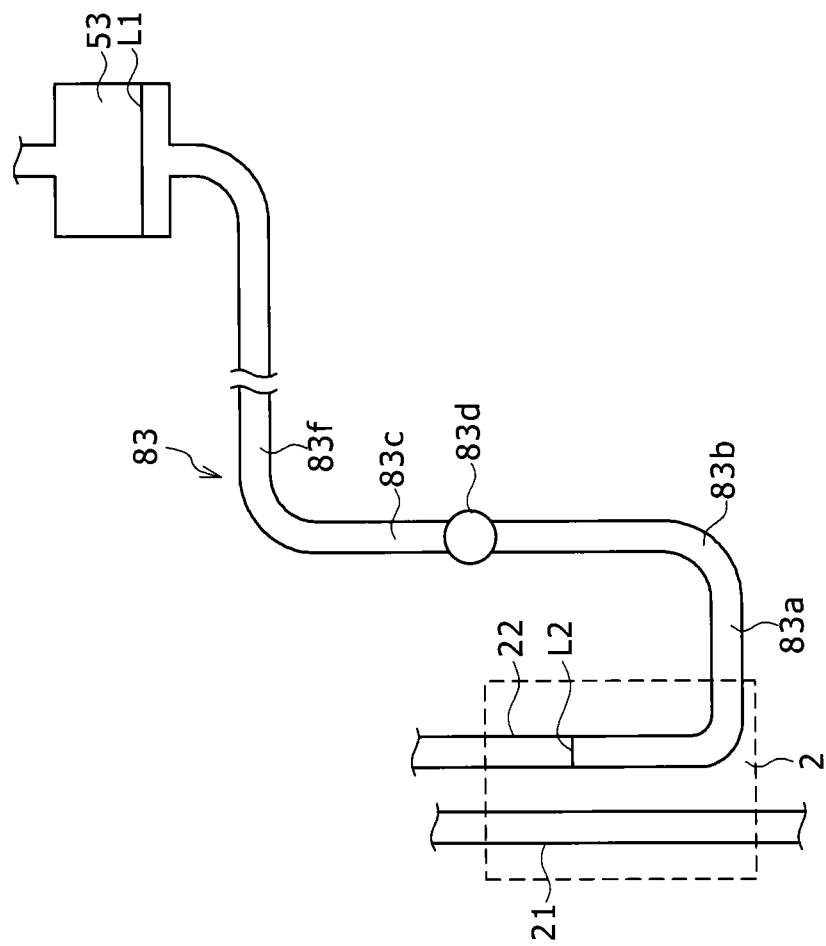

THERMAL ENERGY RECOVERY DEVICE

BACKGROUND OF THE INVENTION

Field of the Invention

The present invention relates to a thermal energy recovery device that recovers exhaust heat.

Description of the Related Art

Conventionally, there is a known device that recovers thermal energy generated in various facilities. As one example of this device, JP 2012-202374 A describes a power generation device including a circulation flow passage in which an evaporator that evaporates a liquid of a working medium by a heat medium, an expander that expands steam of the working medium, a condenser that condenses the steam of the working medium, and a pump that circulates the working medium are connected in series. In the power generation device described in JP 2012-202374 A, the expander includes a screw rotor, and the screw rotor is rotated by the steam of the working medium expanded in the expander. This screw rotor is connected to a power generator, and the power generator converts rotation of the screw rotor into electric power.

The power generation device described in JP 2012-202374 A further includes a pressure sensor that detects pressure of the working medium on the inlet side of the pump, and a derivation means that detects saturated steam pressure of the working medium from a temperature of the working medium on the inlet side of the pump. The power generation device described in JP 2012-202374 A suppresses generation of cavitation in the pump by adjusting a circulation amount of the working medium in accordance with a pressure difference between the pressure detected in the pressure sensor and the saturated steam pressure derived in the derivation means.

The power generation device described in JP 2012-202374 A suppresses the generation of the cavitation by adjusting the circulation amount of the working medium as described above. However, in a case where the power generation device is mounted on a moving body such as a vessel or a vehicle, there is a possibility that due to vibration of the moving body, the working medium in a gas phase is mixed into a pipe part between the condenser and the pump which should essentially be filled with the working medium in a liquid phase and a gas comes into the pump. As a result, there is a possibility that the cavitation is generated in the pump.

SUMMARY OF THE INVENTION

The present invention is achieved from the above viewpoint and an object thereof is to properly perform operation of a thermal energy recovery device even in a case where the thermal energy recovery device is used in an environment where vibration is generated.

A thermal energy recovery device according to the present invention includes a heater that heats a working medium by heat exchange between a heat medium and the working medium, an expander into which the working medium flowing out from the heater flows, a power recovery machine connected to the expander, the power recovery machine recovering power of the expander, a condensing unit positioned on the upper side of the heater, the condensing unit condensing the working medium flowing out from the expander, and a pump positioned on the lower side of the condensing unit, the pump feeding the working medium condensed in the condensing unit to the heater, wherein a connection portion connecting the condensing unit and the pump has a connection end portion connected to an inflow port of the pump, a bent portion bent upward from the connection end portion, and a standing portion extending upward from the bent portion.

In the above thermal energy recovery device, the pump is positioned on the lower side of the condensing unit, and the connection portion connecting the pump and the condensing unit has the standing portion. Therefore, the working medium in a liquid phase is ensured in the standing portion. Thus, even when vibration is generated in the thermal energy recovery device, the working medium in a gas phase is suppressed from intruding into the pump.

Preferably, length of the standing portion is greater than a necessary suction head of the pump.

In the above thermal energy recovery device, generation of cavitation in the pump can be more surely prevented.

Preferably, an existing range of the heater overlaps with the pump in the gravitational direction.

In the above thermal energy recovery device, the existing range of the heater overlaps with the pump in the gravitational direction. Thus, height from the pump to the condensing unit can be extended. Thereby, the length of the standing portion extending upward from the bent portion can be extended, so that the working medium in a gas phase can be more suppressed from coming into the pump.

A thermal energy recovery device according to the present invention includes a heater that heats a working medium by heat exchange between a heat medium and the working medium, an expander into which the working medium flowing out from the heater flows, a power recovery machine connected to the expander, the power recovery machine recovering power of the expander, and a condensing unit positioned on the upper side of the heater, the condensing unit condensing the working medium flowing out from the expander, wherein a connection portion connecting the condensing unit and the heater has a connection end portion connected to the heater, a bent portion bent upward from the connection end portion, and a standing portion extending upward from the bent portion, and wherein the thermal energy recovery device is constructed so that a liquid level of the working medium in a liquid phase formed in the condensing unit or the standing portion is positioned on the upper side of another liquid level of the working medium in a liquid phase formed in the heater, and so that the working medium in a liquid phase flows toward the heater by self-weight of the working medium.

In the above thermal energy recovery device, the working medium in a liquid phase can be fed to the heater by the self-weight of the working medium in a liquid phase. Therefore, there is no need for providing a pump for feeding the working medium in a liquid phase to the heater.

Preferably, the condensing unit has a first flow passage into which a cooling medium for cooling the working medium flows, and a second flow passage into which the working medium flowing out from the expander flows, and the condensing unit is capable of being formed in such a manner that the working medium in a liquid phase does not exist in the second flow passage in order to prevent excessive cooling of the working medium passing through the second flow passage.

The above thermal energy recovery device is designed in such a manner that the working medium condensed in the condensing unit is not accumulated in the condensing unit so as not to cause excessive cooling of the working medium passing through the second flow passage. Since the working medium is not excessively cooled in the condensing unit, pressure on the inflow side of the working medium in the condensing unit can be reduced, and thereby, back pressure of the expander positioned on the upstream side of the condensing unit can be lowered. Therefore, according to the above thermal energy recovery device, a difference between the pressure on the upstream side of the expander and the pressure on the downstream side can be increased, and thereby, energy can be efficiently recovered in the power recovery machine.

Preferably, the heat medium includes at least one of supercharged air supplied to an engine, an exhaust gas discharged from the engine, and steam from an economizer that recovers heat from the exhaust gas.

The above thermal energy recovery device is mounted for example on a moving body such as a vessel or a vehicle where vibration is easily generated and is capable of recovering thermal energy generated around an engine of the moving body.

According to the present invention, even in a case where the thermal energy recovery device is used in an environment where vibration is generated, operation of the thermal energy recovery device can be properly performed.

BRIEF DESCRIPTION OF THE DRAWINGS

FIG. 11 is an enlarged diagram showing a part between the heater and the reservoir of the thermal energy recovery device according to the modified example 5 of FIG. 10.

DESCRIPTION OF THE PREFERRED EMBODIMENTS

Hereinafter, one embodiment of the present invention will be described with reference to the drawings. Note that, in the figures to be cited below, for convenience of the description, necessary major members are simplified for describing a thermal energy recovery device according to the present embodiment. Therefore, the thermal energy recovery device according to the present embodiment can include an arbitrary constituent member which is not shown in the figures to be cited in the present description.

Figure 1:
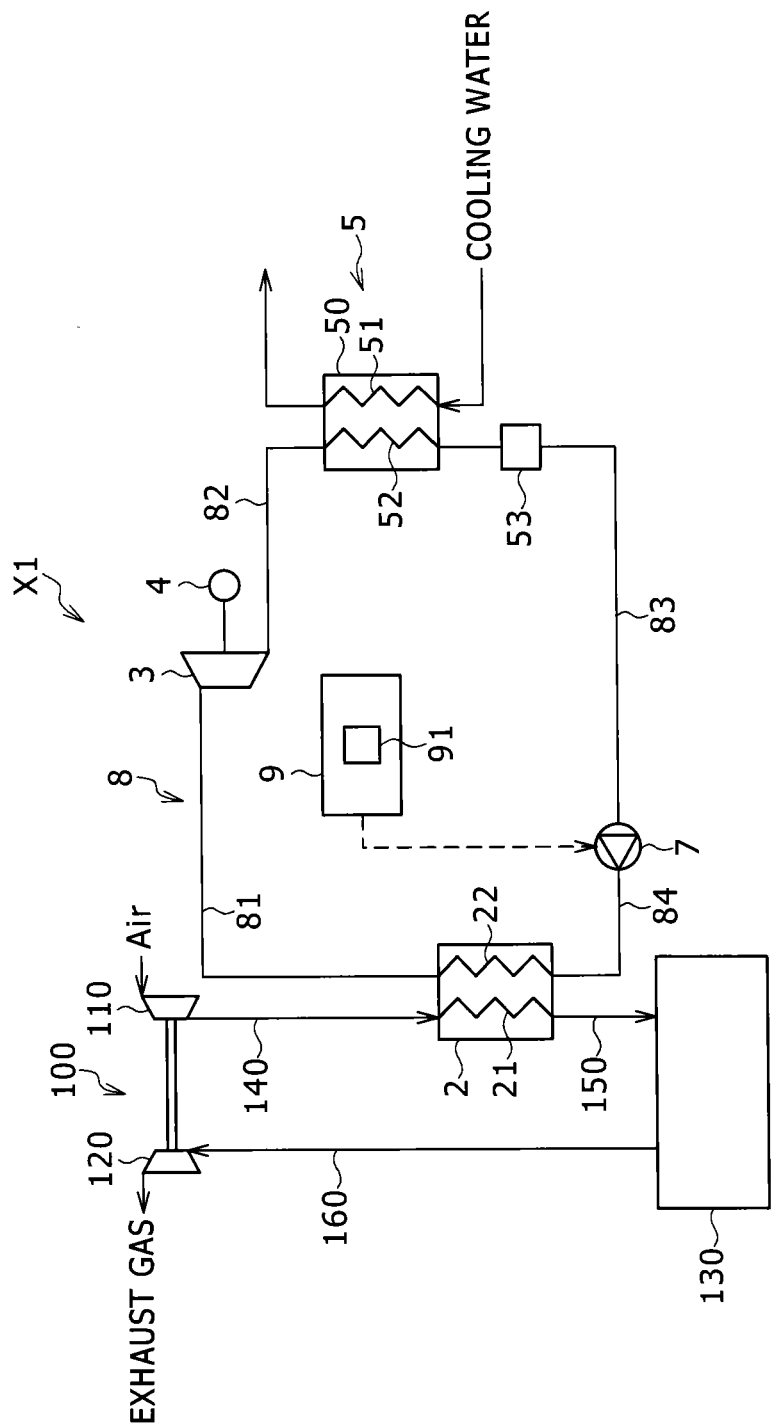
FIG. 1 is a schematic configuration diagram of a thermal energy recovery device according to an embodiment of the present invention.
Figure 6:
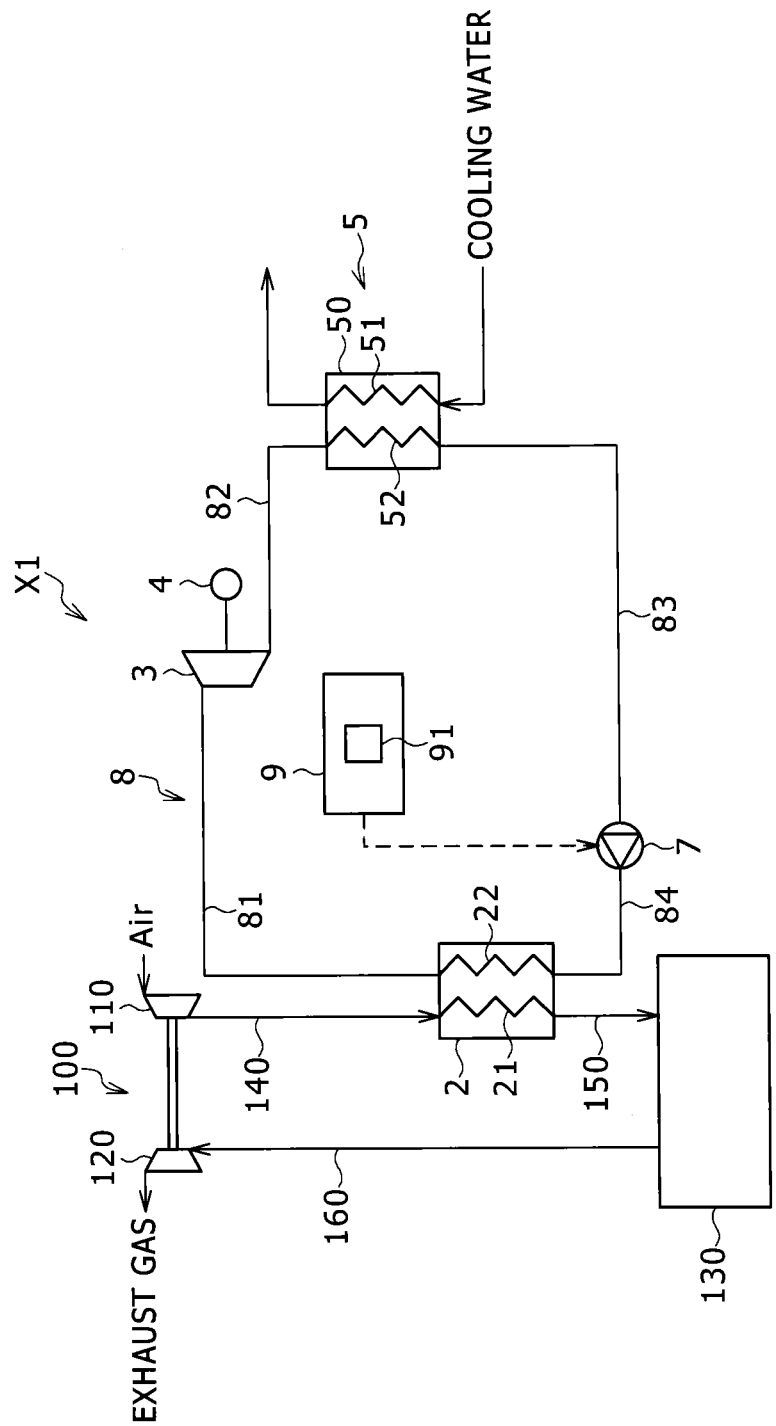
FIG. 6 is a schematic configuration diagram of the thermal energy recovery device according to a modified example 1.
Figure 9:
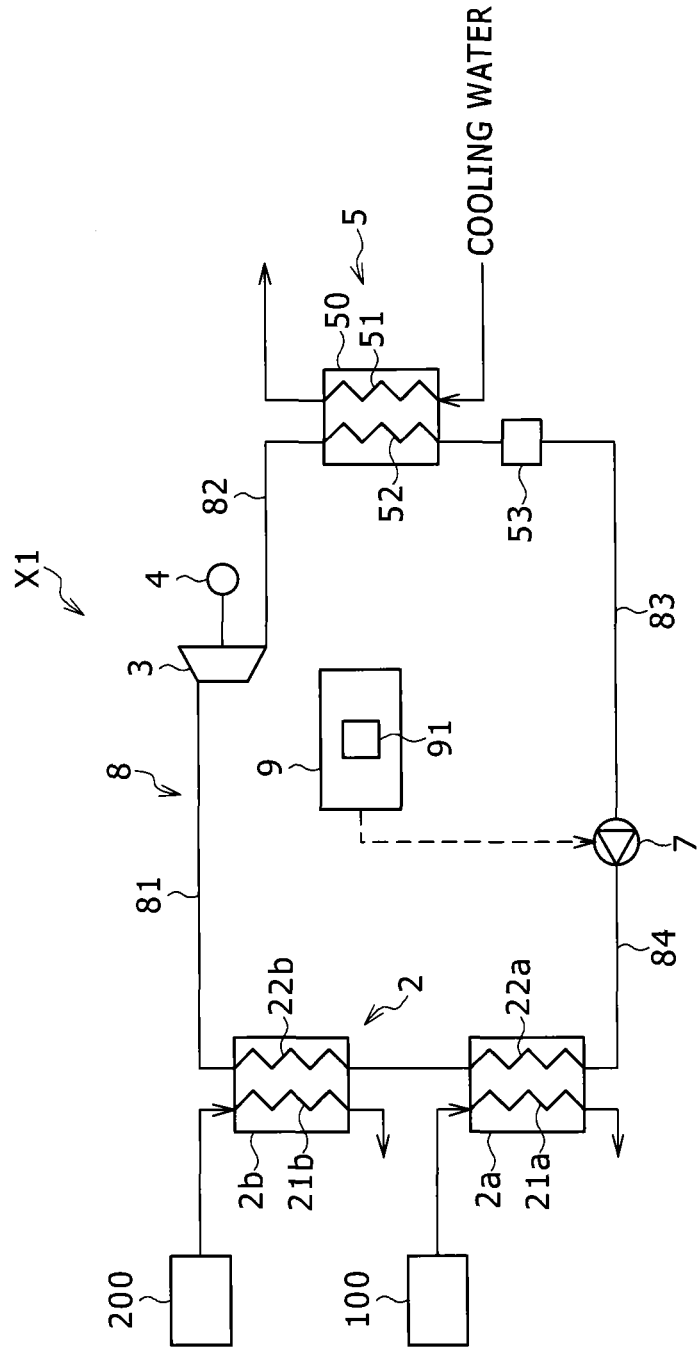
FIG. 9 is a schematic configuration diagram showing the thermal energy recovery device according to a modified example 4.
Figure 10:
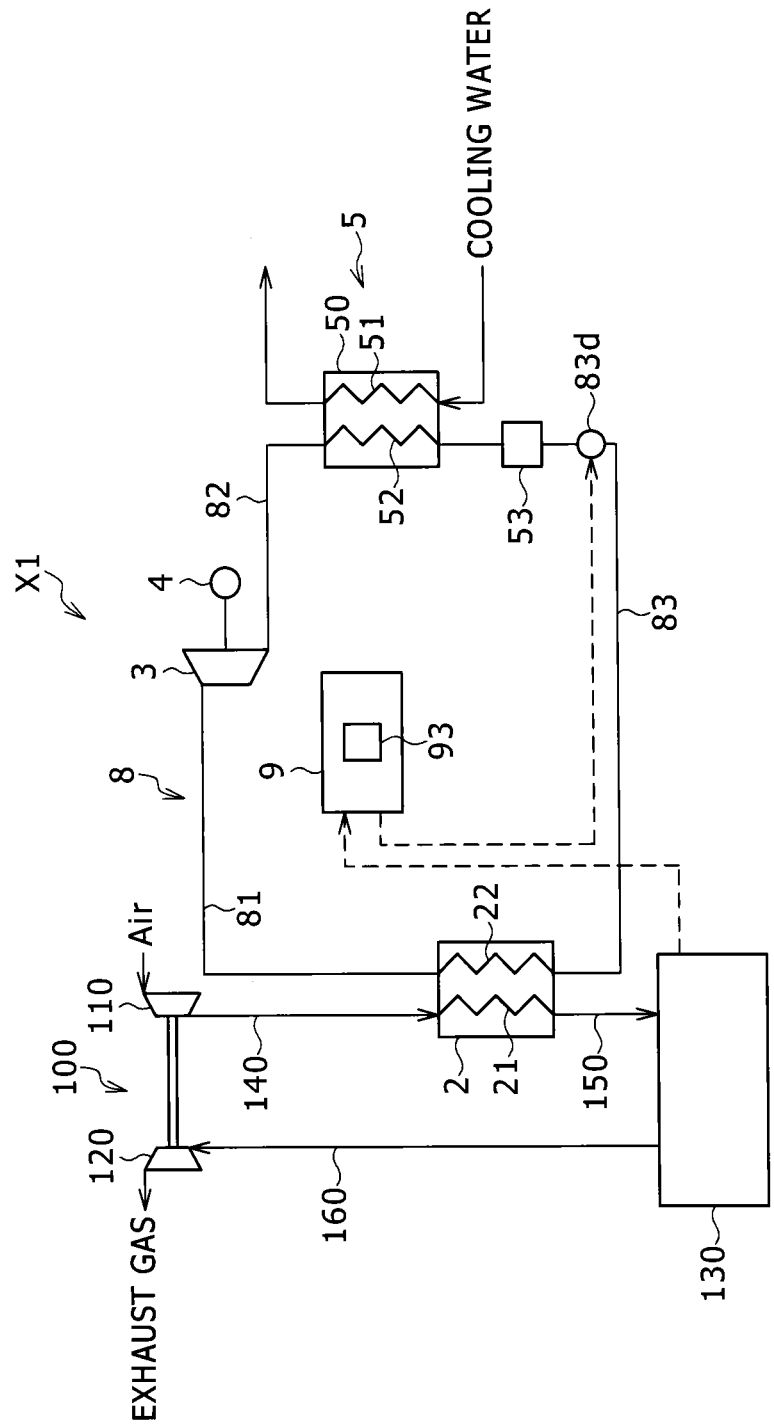
FIG. 10 is a schematic configuration diagram of the thermal energy recovery device according to a modified example 5.

As shown in FIG. 1, a thermal energy recovery device X1 includes a heater 2, an expander 3, a power generator 4, a condensing unit 5, a pump 7, a circulation flow passage 8, and a control unit 9. In the circulation flow passage 8, the heater 2, the expander 3, the condensing unit 5, and the pump 7 are connected in this order. In the following description, a part of the circulation flow passage 8 connecting the heater 2 and the expander 3 is called as the "first connection portion 81". A part connecting the expander 3 and a condenser 50 of the condensing unit 5 to be described later is called as the "second connection portion 82". A part connecting the condenser 50 and the pump 7 is called as the "third connection portion 83". A part connecting the pump 7 and the heater 2 is called as the "fourth connection portion 84". It should be noted that the circulation flow passage 8 is simplified in FIG. 1 and a detailed shape of the third connection portion 83 will be described later. In FIGS. 6, 9, 10, the circulation flow passage 8 is also simplified.

In the present embodiment, the thermal energy recovery device X1 is mounted on a vessel and used for recovering exhaust heat of a supercharger engine 100.

The supercharger engine 100 has a supercharger, an engine 130, scavenging lines 140, 150, and an exhaust line 160. The supercharger has a compressor 110, and a turbine 120 connected to the compressor 110. The supercharged air compressed in the compressor 110 is supplied to the engine 130 through the scavenging lines 140, 150. An exhaust gas from the engine 130 is fed to the turbine 120 through the exhaust line 160. The turbine 120 is driven by expansion energy of the exhaust gas, and the compressor 110 is driven by drive force of this turbine 120. In the thermal energy recovery device X1 according to the present embodiment, the heater 2 is positioned between the scavenging line 140 and the scavenging line 150, so that the exhaust heat of the supercharged air moved from the scavenging line 140 to the scavenging line 150 can be recovered.

The heater 2 has a first flow passage 21 and a second flow passage 22. The first flow passage 21 is a flow passage through which the supercharged air from the compressor 110 flows. One end of the first flow passage is connected to the scavenging line 140 and the other end is connected to the scavenging line 150. The second flow passage 22 is a flow passage through which a working medium flows. The heater 2 evaporates the working medium by heat exchange between the supercharged air flowing through the first flow passage 21 and the working medium in a liquid phase flowing through the second flow passage 22.

The expander 3 is positioned on the downstream side of the heater 2 in the circulation flow passage 8. The expander 3 and the second flow passage 22 of the heater 2 are connected to each other via the first connection portion 81 of the circulation flow passage 8. The working medium evaporated in the heater 2 flows into the expander 3 through the first connection portion 81.

In the present embodiment, a volumetric screw expander having a rotor to be driven and rotated by expansion energy of a working medium in a gas phase is used as the expander 3. It should be noted that the expander 3 is not limited to the volumetric screw expander but a centrifugal expander, a scrolling expander, or the like may be used.

The power generator 4 is connected to the expander 3. The power generator 4 has a rotation shaft connected to one of a pair of screw rotors of the expander 3. The power generator 4 generates electric power by rotating the rotation shaft in accordance with rotation of the screw rotor. It should be noted that in addition to the power generator 4, a compressor or the like may be used as a power recovery machine connected to the expander 3.

The condensing unit 5 is arranged on the upper side of the heater 2 in the gravitational direction. The condensing unit 5 has the condenser 50 and a reservoir 53.

The condenser 50 is positioned on the downstream side of the expander 3 in the circulation flow passage 8. The condenser 50 has a first flow passage 51 and a second flow passage 52. The first flow passage 51 is a flow passage through which cooling water flows. The second flow passage 52 is a flow passage through which the working medium flows. The second flow passage 52 is connected to the expander 3 via the second connection portion 82 of the circulation flow passage 8. The working medium in a gas phase flowing out from the expander 3 flows into the second flow passage 52 of the condenser 50 through the second connection portion 82. By heat exchange between the working medium in a gas phase flowing through the second flow passage 52 and the cooling water flowing through the first flow passage 51, the working medium is condensed. It should be noted that although for example seawater is used as the cooling water flowing through the first flow passage 51, the present invention is not limited to this. The cooling water may be any cooling medium capable of condensing the working medium in a gas phase flowing through the second flow passage 52.

The second flow passage 52 of the condenser 50 is designed in such a manner that flow passage resistance is small and the working medium in a liquid phase is not accumulated. Thereby, excessive cooling of the working medium is prevented. Pressure on the inflow side of the working medium in the condenser 50 can be reduced, so that back pressure of the expander 3 positioned on the upstream side of the second flow passage 52 can be lowered. As a result, a difference between the pressure on the upstream side of the expander 3 and the pressure on the downstream side can be increased, so that power generation efficiency of the power generator 4 can be improved.

The reservoir 53 is positioned on the downstream side of the condenser 50 in the circulation flow passage 8. The working medium condensed in the condenser 50 is reserved in the reservoir 53.

The pump 7 is positioned on the downstream side of the reservoir 53 in the circulation flow passage 8. The pump 7 is arranged on the several-meter lower side of the reservoir 53 in the gravitational direction. The reservoir 53 and the pump 7 are connected to each other via the third connection portion 83 of the circulation flow passage 8. The pump 7 and the second flow passage 22 of the heater 2 are connected to each other via the fourth connection portion 84 of the circulation flow passage 8. The working medium in a liquid phase reserved in the reservoir 53 flows into the pump 7 and is fed to the second flow passage 22 of the heater 2 at predetermined pressure by the pump 7. A centrifugal pump including an impeller as a rotor, a gear pump including a rotor of a pair of gears, or the like is used as the pump 7.

The control unit 9 functionally has a pump control unit 91 that controls drive of the pump 7. In general, the pump control unit 91 drives the pump 7 in a state where the working medium in a liquid phase is sufficiently reserved in the reservoir 53. A function of the pump control unit 91 is realized for example by a CPU, a memory, and the like.

Figure 2:
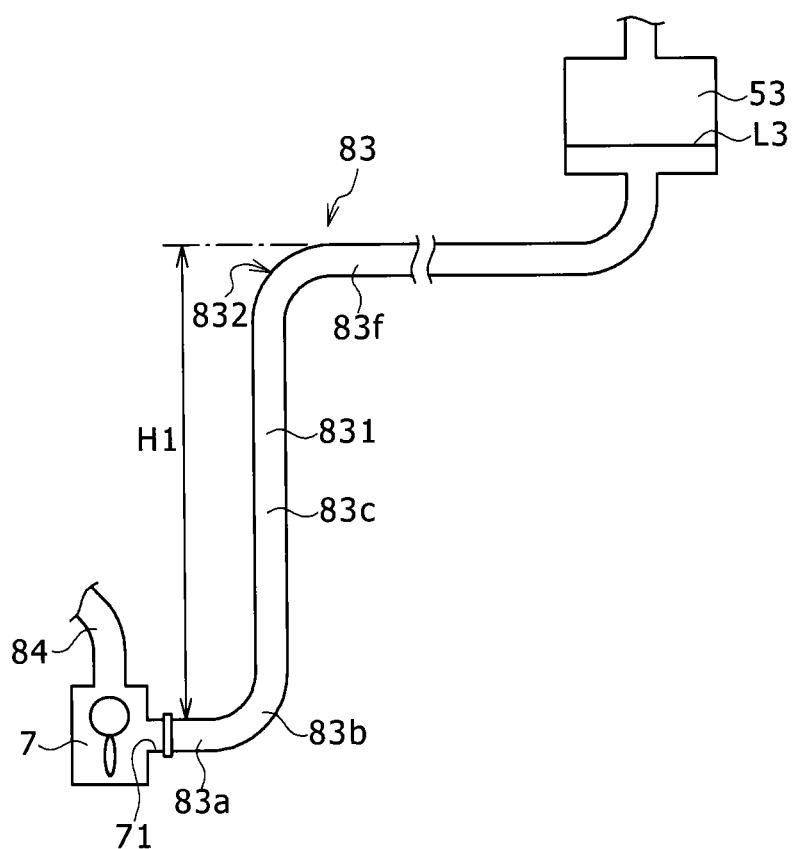
FIG. 2 is an enlarged diagram showing a part between a pump and a reservoir of the thermal energy recovery device according to the present embodiment.

FIG. 2 is an enlarged diagram showing the reservoir 53 and the third connection portion 83. The third connection portion 83 has a connection end portion 83a, a bent portion 83b, a standing portion 83c, and a horizontal portion 83f. The connection end portion 83a is directly connected to an inflow port 71 of the working medium provided on a side surface of the pump 7.

The bent portion 83b is a part bent upward from the connection end portion 83a. It should be noted that although the bent portion 83b is bent substantially perpendicularly to the connection end portion 83a in the present embodiment, there is no need for strictly bending the part by 90°. The standing portion 83c includes a straight part 831 extending linearly upward from the bent portion 83b, and an upper part 832 connecting the straight part 831 and the horizontal portion 83f. The upper part 832 is positioned on the upper side of the heater 2 in the gravitational direction. Length H1 of the standing portion 83c is set to be greater than a necessary suction head of the pump 7. The horizontal portion 83f is a part horizontally extending from the standing portion 83c, and an end of the horizontal portion 83f, the end being opposite to an end connected to the standing portion 83c is connected to the reservoir 53. In the thermal energy recovery device X1, the third connection portion 83 is filled with the working medium in a liquid phase over the entire length.

Figure 3:
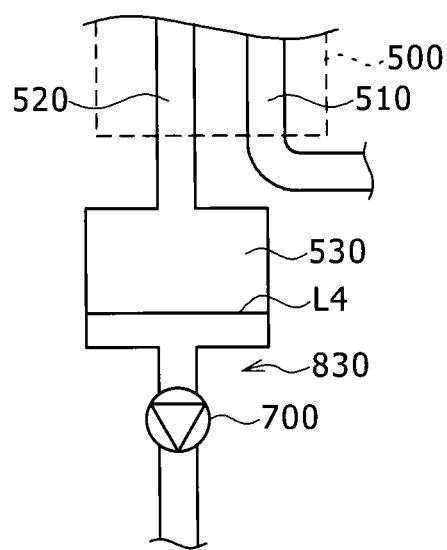
FIG. 3 is a schematic configuration diagram of a comparative example of the thermal energy recovery device according to the present embodiment, showing a state where a pump is arranged in the vicinity of a reservoir.

A thermal energy recovery device according to a comparative example (hereinafter, simply referred to as the "comparative example") will be described with reference to FIG. 3. The comparative example has a condenser 500, a reservoir 530, a pump 700, and a third connection portion 830. The third connection portion 830 is sufficiently shorter than the third connection portion 83 of FIG. 2, and the pump 700 is arranged in the vicinity of the reservoir 530. The third connection portion 830 does not include parts corresponding to the bent portion 83b and the standing portion 83c of the third connection portion 83 of FIG. 2. The working medium in a liquid phase is reserved in the reservoir 530, and the third connection portion 830 is filled with the working medium in a liquid phase.

Figure 4:
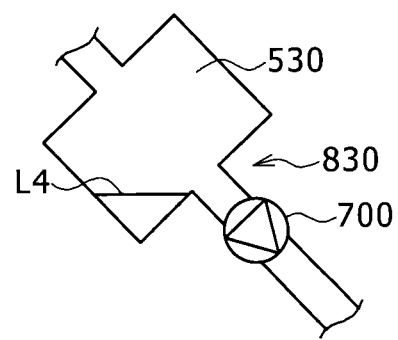
FIG. 4 is a schematic configuration diagram showing a case where the thermal energy recovery device according to the comparative example shown in FIG. 3 is inclined.

In a case where the thermal energy recovery device is mounted on a moving body such as a vessel, and when the thermal energy recovery device is vibrated in accordance with vibration of the moving body, there is a fear that an outlet part of the reservoir 530 is exposed from a liquid level as shown in FIG. 4. In the comparative example, since a distance between the reservoir 530 and the pump 700 is short, the working medium in a gas phase easily intrudes into the driving pump 700 via the third connection portion 830. As a result, cavitation is generated in the pump 700, so that the life of the pump 700 is shortened. A discharge capacity of the pump 700 is reduced, so that the power generation efficiency is lowered.

Figure 5:
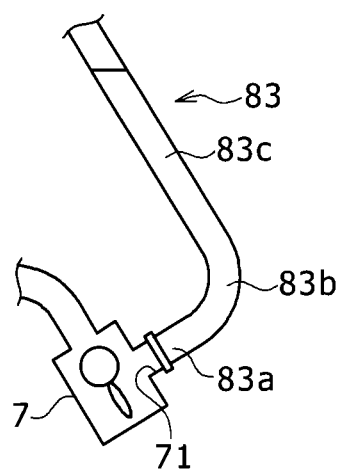
FIG. 5 is a schematic configuration diagram showing a case where the thermal energy recovery device according to the present embodiment is inclined.

Meanwhile, in the thermal energy recovery device X1, even in a case where an outlet part of the reservoir 53 is exposed from a liquid level due to vibration of the moving body, as shown in FIG. 5, by providing the standing portion 83c of the third connection portion 83, the working medium in a liquid phase is accumulated in a lower part of the standing portion 83c (that is, a part on the downstream side). Thus, the pump 7 is prevented from being brought into contact with the working medium in a gas phase.

In the thermal energy recovery device X1 described above, by providing the standing portion 83c having such length that the working medium in a gas phase (or a gas space) does not reach the pump 7 even under an environment where vibration is generated, generation of the cavitation and shortage in the discharge capacity in the pump 7 are prevented. As a result, operation of the thermal energy recovery device is properly performed under the above environment.

In the thermal energy recovery device X1, the bent portion 83b of the third connection portion 83 is bent upward, and the inflow port 71 formed on the side surface of the pump 7 and the standing portion 83c extending on the upper side of the inflow port 71 are connected by the bent portion. Therefore, even in a case where the general pump 7 with the inflow port 71 provided on the side surface is used, a possibility that the working medium in a gas phase comes into the pump 7 can be reduced.

Further, in the thermal energy recovery device X1 according to the present embodiment, since the length of the standing portion 83c is set to be greater than the necessary suction head of the pump 7, the generation of the cavitation of the pump 7 can be more surely prevented.

FIG. 6 shows a modified example of the thermal energy recovery device X1. In the thermal energy recovery device X1, the reservoir 53 may be omitted from the condensing unit 5. Even in such a case, by providing the standing portion 83c (refer to FIG. 2) on the downstream side of the second flow passage 52 of the condenser 50, a sufficient amount of the working medium in a liquid phase can be reserved in the standing portion 83c. That is, the standing portion 83c can play the same role as the reservoir 53.

Figure 7:
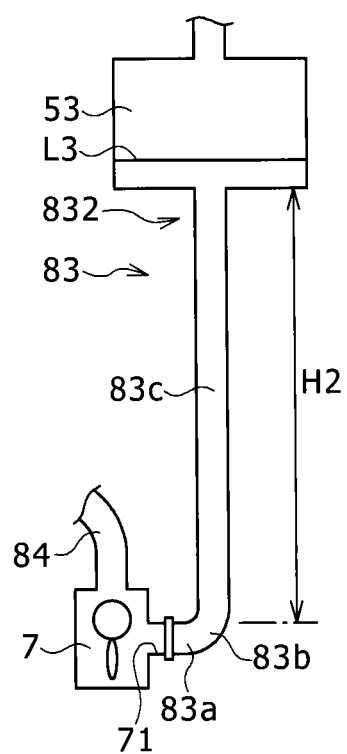
FIG. 7 is an enlarged diagram showing a part between the pump and the reservoir of the thermal energy recovery device according to a modified example 2.

FIG. 7 shows another modified example of the thermal energy recovery device X1. The horizontal portion of the third connection portion 83 may be omitted and the upper part 832 of the standing portion 83c may be directly connected to the reservoir 53. It should be noted that in a case where the reservoir 53 is omitted, the upper part 832 of the standing portion 83c is connected to the condenser 50. In FIG. 7, height H2 from the inflow port 71 of the pump 7 to the reservoir 53 is the substantially same as the length of the standing portion 83c.

Figure 8:
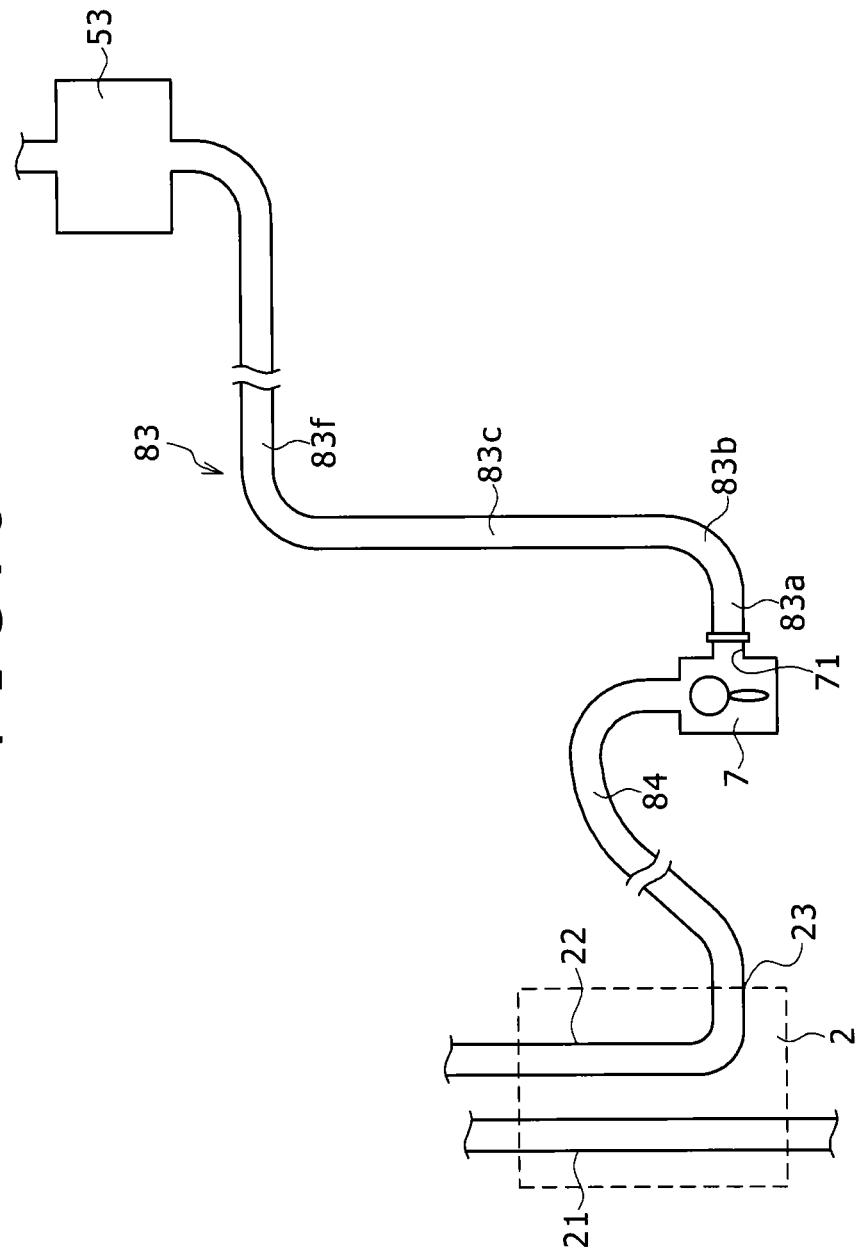
FIG. 8 is an enlarged diagram showing a part between a heater and the reservoir of the thermal energy recovery device according to a modified example 3.

FIG. 8 shows a still another modified example of the thermal energy recovery device X1. In FIG. 8, an existing range of the heater 2 overlaps with the pump 7 in the gravitational direction. More preferably, an inflow portion 23 serving as the inflow side of the working medium in the second flow passage 22 of the heater 2 has the substantially same height as the pump 7. With such a configuration, height from the inflow port 71 of the pump 7 to the reservoir 53 can be extended. Thus, the length of the standing portion 83c can be extended. Therefore, the working medium in a gas phase can be more suppressed from intruding into the pump 7.

In the thermal energy recovery device X1, the heater may be formed by a plurality of heat exchangers. In a modified example shown in FIG. 9, a heat exchanger 2a that recovers heat from the supercharged air compressed in the compressor 110 of the supercharger engine 100 is provided and a heat exchanger 2b that recovers heat of steam from an economizer 200 is provided on the downstream side of the heat exchanger 2a. The heater 2 is formed by the heat exchangers 2a, 2b. The economizer 200 has a role in recovering exhaust heat of the supercharger engine 100, and the steam generated in accordance with the recovery flows into a first flow passage 21b of the heat exchanger 2b. Heat exchange is performed between the steam passing through the first flow passage 21b and the working medium passing through a second flow passage 22b. In a structure of FIG. 9, when all the working medium becomes steam in the heat exchanger 2b, the entire amount of the working medium in a liquid phase is not necessarily evaporated in the heat exchanger 2a. In the thermal energy recovery device X1, a heat exchanger that directly recovers heat of the exhaust gas discharged from the engine 130 as a heat medium may be provided. In such a way, the thermal energy recovery device X1 includes at least one of the supercharged air supplied to the engine 130, the exhaust gas discharged from the engine 130, and the steam from the economizer 200 that recovers the heat from the exhaust gas as the heat medium.

FIGS. 10 and 11 show yet another modified example of the thermal energy recovery device X1. In the thermal energy recovery device X1, the working medium in a liquid phase may be fed to the heater 2 not by providing the pump 7 itself but by utilizing a shape of the third connection portion 83. The connection end portion 83a of the third connection portion 83 is connected to the second flow passage 22 of the heater 2. A shutoff valve 83d is provided in the standing portion 83c of the third connection portion 83. The control unit 9 functionally has a shutoff valve control unit 93 in place of the pump control unit 91. In this thermal energy recovery device X1, a liquid level L1 of the working medium in a liquid phase formed in the standing portion 83c or the reservoir 53 is positioned on the upper side of another liquid level L2 of the working medium in a liquid phase formed in the second flow passage 22 of the heater 2. Therefore, at the time of driving the thermal energy recovery device X1, the working medium in a liquid phase flows toward the heater 2 by self-weight (of the working medium in a liquid phase). At the time of stopping the thermal energy recovery device X1, the shutoff valve 83d provided in the standing portion 83c is closed, so that the working medium in a liquid phase is suppressed from flowing into the second flow passage 22 of the heater 2.

In the thermal energy recovery device X1 shown in FIGS. 10 and 11, no cavitation can be generated. Further, the working medium in a liquid phase is ensured in the standing portion 83c. Thus, even when the outlet part of the reservoir 53 is exposed from the liquid level due to vibration, the operation can be properly continued.

In the above embodiment, the example that the thermal energy recovery device X1 is mounted on a vessel is described. However, the present invention is not limited to this but the thermal energy recovery device X1 may be mounted on other moving body such as a vehicle where vibration is easily generated.

The present embodiment described above is thought to be not restriction but only an example in all aspects. The scope of the present invention is indicated not by the above description of the embodiment but by the claims, and includes equivalent meanings to the claims and all modifications within the scope.

What is claimed is:

1. A thermal energy recovery device comprising:
    a heater that heats a working medium by heat exchange between a heat medium and the working medium;
    an expander into which the working medium flowing out from said heater flows;
    a power recovery machine connected to said expander, said power recovery machine recovering power of said expander;
    a condensing unit positioned above said heater in a gravitational direction said condensing unit condensing the working medium flowing out from said expander; and
    a pump positioned below said condensing unit in the gravitational direction, said pump feeding the working medium condensed in said condensing unit to said heater,
    wherein a connector connecting said condensing unit and said pump has a connection end portion connected to an inflow port of said pump, a bent portion bent upward from said connection end portion, and a standing portion extending upward from said bent portion.

2. The thermal energy recovery device according to claim 1,
wherein length of said standing portion is greater than a necessary suction head of said pump.

3. The thermal energy recovery device according to claim 1,
wherein a height of said heater overlaps with said pump in the gravitational direction.

4. The thermal energy recovery device according to claim 1,
wherein said condensing unit has a first flow passage into which a cooling medium for cooling the working medium flows, and a second flow passage into which the working medium flowing out from said expander flows, and
wherein said condensing unit is formed such that the working medium in a liquid phase, condensed by said condensing unit, is not retained in said second flow passage.

5. The thermal energy recovery device according to claim 1,
wherein the heat medium includes at least one of supercharged air supplied to an engine, an exhaust gas discharged from the engine, and steam from an economizer that recovers heat from the exhaust gas.

* * * * *